(12) United States Patent
Seol (10) Patent No.: US 12,391,123 B2
(45) Date of Patent: Aug. 19, 2025

(54) COOPERATIVE BRAKE APPARATUS AND CONTROL METHOD THEREOF

(71) Applicant: HYUNDAI MOBIS CO., LTD., Seoul (KR)

(72) Inventor: Yong Cheol Seol, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 342 days.

(21) Appl. No.: 18/087,020

(22) Filed: Dec. 22, 2022

(65) Prior Publication Data

US 2023/0294520 A1    Sep. 21, 2023

(30) Foreign Application Priority Data

Mar. 16, 2022  (KR) .................. 10-2022-0032789

(51) Int. Cl.
*B60L 7/26*     (2006.01)
*B60T 8/32*     (2006.01)
(Continued)

(52) U.S. Cl.
CPC .............. *B60L 7/26* (2013.01); *B60T 8/3215* (2013.01); *B60T 8/885* (2013.01); *B60T 8/92* (2013.01);
(Continued)

(58) Field of Classification Search
CPC .......... B60L 2240/12; B60L 2240/429; B60L 2240/525; B60L 2240/526;
(Continued)

(56) References Cited

U.S. PATENT DOCUMENTS

2005/0269875 A1*  12/2005  Maki ................ B60T 8/38
                                              303/152
2006/0066146 A1*   3/2006  Otomo ........... B60T 13/147
                                              303/151
(Continued)

FOREIGN PATENT DOCUMENTS

CN      108263217 A  *  7/2018
CN      111746290 B  *  9/2023  ............. B60L 58/12
(Continued)

*Primary Examiner* — Babar Sarwar
(74) *Attorney, Agent, or Firm* — Morgan, Lewis & Bockius LLP (57) ABSTRACT

A cooperative brake apparatus comprises: a regenerative brake device configured to apply a regenerative braking force to a vehicle a hydraulic brake device configured to apply a hydraulic braking force to at least one wheels using a hydraulic pressure formed by a motor including a first coil and a second coil and a control unit including a power supply device, a first driving circuit configured to transmit electrical energy of the power supply device to the first coil, a second driving circuit configured to transmit the electrical energy of the power supply device to the second coil, a first motor controller configured to control a current applied to the first driving circuit, and a second motor controller configured to adjust a current applied to the second driving circuit, wherein each of the first motor controller and the second motor controller controls the current applied to the first driving circuit and the second driving circuit, respectively, based on the regenerative braking force.

18 Claims, 6 Drawing Sheets

(51) Int. Cl.
  *B60T 8/88* (2006.01)
  *B60T 8/92* (2006.01)
  *B60T 17/22* (2006.01)
(52) U.S. Cl.
  CPC ......... *B60T 17/22* (2013.01); *B60T 2270/402* (2013.01); *B60T 2270/403* (2013.01); *B60T 2270/406* (2013.01); *B60T 2270/413* (2013.01); *B60T 2270/604* (2013.01); *B60T 2270/88* (2013.01)
(58) Field of Classification Search
  CPC .. B60L 2240/529; B60L 3/003; B60L 3/0092; B60L 3/04; B60L 7/26; B60T 17/22; B60T 2270/402; B60T 2270/403; B60T 2270/406; B60T 2270/413; B60T 2270/604; B60T 2270/88; B60T 8/3215; B60T 8/885; B60T 8/92
  See application file for complete search history.

(56) References Cited

U.S. PATENT DOCUMENTS

| | | | | |
|---|---|---|---|---|
| 2007/0241611 A1* | 10/2007 | Shimada | ................ | B60K 6/44 303/155 |
| 2008/0100131 A1* | 5/2008 | Jeon | ................ | B60T 8/266 303/152 |
| 2013/0062932 A1* | 3/2013 | Yagashira | ................ | B60L 7/14 303/3 |
| 2013/0131901 A1* | 5/2013 | Yamagata | ................ | B60L 50/16 180/65.265 |
| 2018/0154777 A1* | 6/2018 | Hall | ................ | B60L 7/18 |
| 2018/0215363 A1* | 8/2018 | Kita | ................ | B60L 7/042 |
| 2019/0135258 A1* | 5/2019 | Chuang | ................ | B60T 13/662 |
| 2019/0193569 A1* | 6/2019 | Oh | ................ | B60L 7/26 |
| 2019/0193570 A1* | 6/2019 | Okumura | ................ | F16D 61/00 |
| 2020/0122728 A1* | 4/2020 | Murase | ................ | B60L 7/18 |
| 2020/0307386 A1* | 10/2020 | Takahashi | ................ | B60T 1/10 |
| 2021/0188233 A1* | 6/2021 | Yuyama | ................ | H02K 11/33 |
| 2022/0063417 A1* | 3/2022 | Lee | ................ | B60L 50/16 |
| 2022/0134888 A1* | 5/2022 | Ko | ................ | B60T 8/4081 303/3 |

FOREIGN PATENT DOCUMENTS

| | | | | |
|---|---|---|---|---|
| CN | 113525323 B | * | 11/2023 | ............ B60T 13/146 |
| EP | 2463165 A1 | * | 6/2012 | ......... B60L 15/2009 |
| JP | 2013230800 A | * | 11/2013 | ............ B60L 1/003 |
| WO | WO-2009022211 A1 | * | 2/2009 | ............ B60K 6/445 |
| WO | WO-2009081270 A1 | * | 7/2009 | ............ B60T 1/10 |
| WO | WO-2014034678 A1 | * | 3/2014 | ............ B60L 7/14 |
| WO | WO-2017057441 A1 | * | 4/2017 | ......... B60L 15/2009 |

* cited by examiner

COOPERATIVE BRAKE APPARATUS AND CONTROL METHOD THEREOF

CROSS-REFERENCE TO RELATED APPLICATIONS

The present application is based on and claims the benefit of priority to Korean Patent Application Number 10-2022-0032789, filed on Mar. 16, 2022 in the Korean Intellectual Property Office, the entire disclosure of which is incorporated herein by reference.

TECHNICAL FIELD

The present disclosure relates to a cooperative brake apparatus and a control method thereof.

BACKGROUND

The content described in this section merely provides background information for the present disclosure and does not constitute the prior art.

A regenerative brake device is configured to convert kinetic energy of at least one wheels into electrical energy and apply a braking force to a vehicle using the converted electrical energy. A hydraulic brake device is configured to apply a braking force to at least one wheels using a hydraulic pressure generated by a master cylinder and a motor pump. A cooperative brake apparatus includes the regenerative brake device and the hydraulic brake device, and is configured to drive the regenerative brake device and the hydraulic brake device simultaneously to generate a required braking force. When only the hydraulic brake device generates the required braking force to satisfy the required braking force, the hydraulic braking force that the hydraulic brake device must generate is simply equal to the required braking force. The regenerative braking force applied to the vehicle by the regenerative brake device is changed with time and the amount of power generated. Therefore, in the situation of cooperative control of the regenerative brake device and the hydraulic brake device, the hydraulic braking force of the hydraulic brake device should be controlled more precisely. When the hydraulic braking force is not precisely controlled, the cooperative brake apparatus cannot generate the required braking force, which can lead to accidents.

Meanwhile, in order to secure reliability of the hydraulic brake device, a sub-coil and sub-inverter of a motor may be additionally provided separately from a main coil and a main inverter of the motor. Often, the sub-coil and sub-inverter are for supporting the main coil and main inverters, and thus, have the same or lower specifications than main coil and main inverter. When the cooperative control is performed by the sub-coil and the sub-inverter, there is a problem in that it is difficult for the hydraulic brake device to generate a hydraulic braking force corresponding to the required braking force.

SUMMARY

Therefore, the present disclosure is derived to improve the above problems, and according to a cooperative brake apparatus and a control method thereof according to one embodiment of the present disclosure, when a required braking force can be satisfied only by a hydraulic braking force and a regenerative braking force caused by a current applied to a main coil, by not energizing a sub-inverter, it is possible to precisely control the hydraulic braking force generated by the hydraulic brake device in a cooperative control situation.

The problems to be solved by the present disclosure are not limited to the problems mentioned above, and other problems not mentioned will be clearly understood by those skilled in the art from the following description.

As described above, according to the cooperative brake apparatus and the control method thereof according to one embodiment of the present disclosure, when the required braking force can be satisfied only by the hydraulic braking force and the regenerative braking force caused by the current applied to the main coil, by not energizing the sub-inverter, it is possible to precisely control the hydraulic braking force generated by the hydraulic brake device in the cooperative control situation.

DETAILED DESCRIPTION

Figure 1:
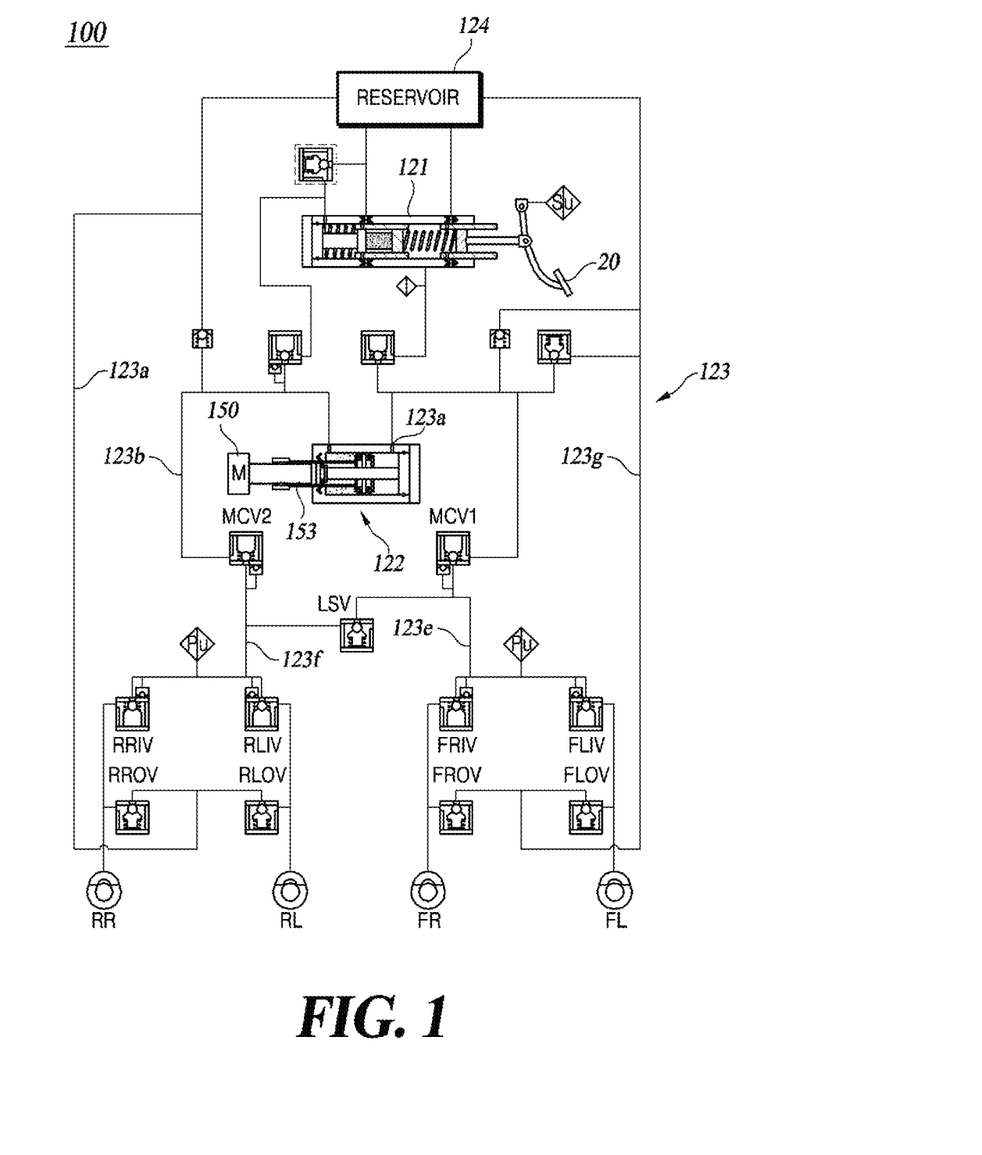
FIG. 1 is a hydraulic circuit diagram illustrating a hydraulic brake device of a cooperative brake apparatus according to one embodiment of the present disclosure.

FIG. 1 is a hydraulic circuit diagram illustrating a hydraulic brake device of a cooperative brake apparatus according to one embodiment of the present disclosure.

Figure 2:
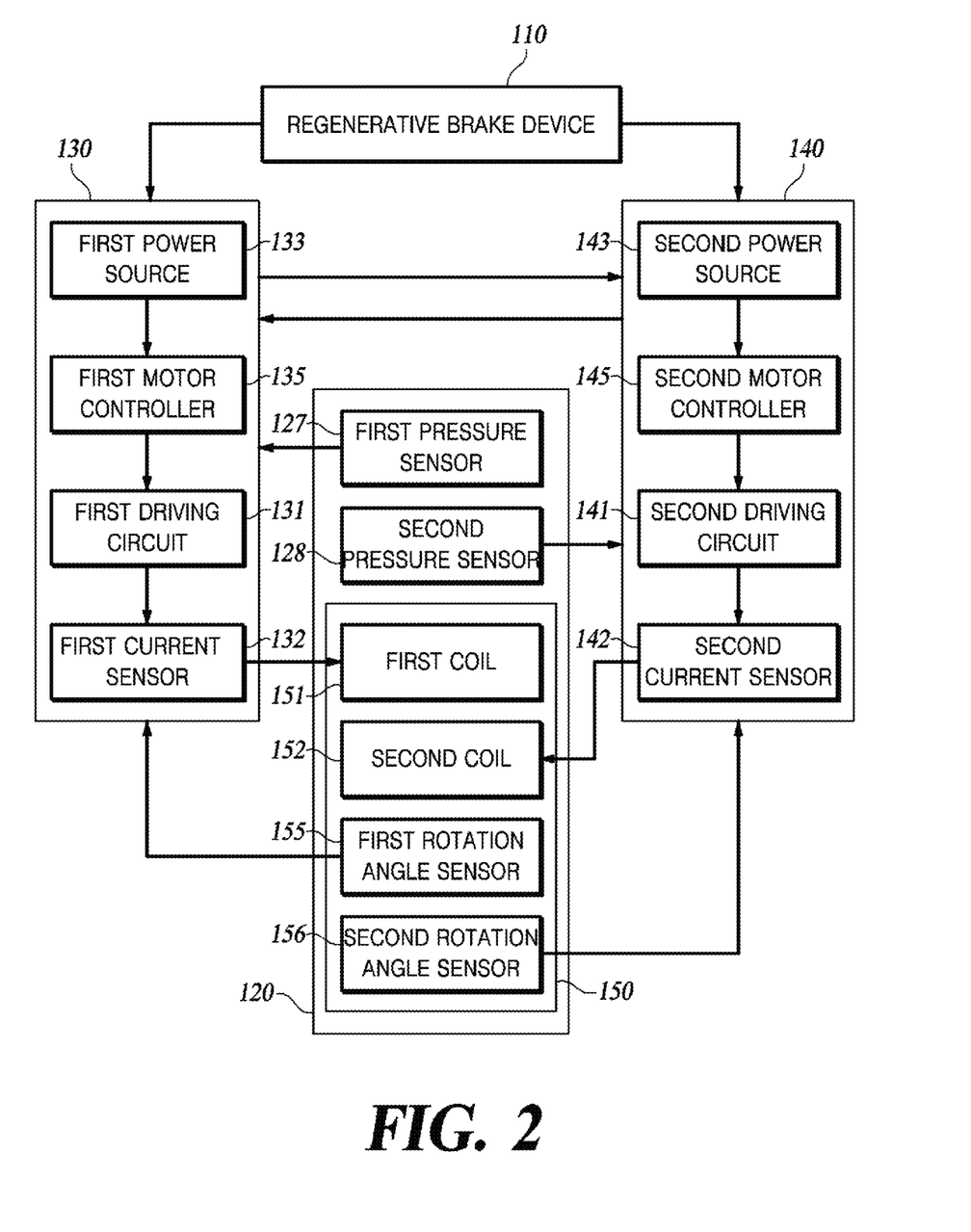
FIG. 2 is a block diagram schematically illustrating a configuration of the cooperative brake apparatus according to one embodiment of the present disclosure.

FIG. 2 is a block diagram schematically illustrating a configuration of the cooperative brake apparatus according to one embodiment of the present disclosure.

Referring to FIGS. 1 and 2, a cooperative brake apparatus 100 according to one embodiment of the present disclosure includes a regenerative brake device 110, a hydraulic brake device 120, a first control unit 130, and a second control unit 140.

The regenerative brake device 110 is configured to convert kinetic energy of at least one wheels into electrical energy and apply a braking force to a vehicle using the converted electrical energy. Hereinafter, a braking force applied by the regenerative brake device 110 to the vehicle is referred to as a "regenerative braking force", and a braking force applied by the hydraulic brake device 120 to the vehicle is referred to as a "hydraulic braking force". The regenerative brake device 110 is configured to transmit information on a magnitude of the regenerative braking force to control units 130 and 140.

The hydraulic brake device 120 may include all or some of a master cylinder 121, a hydraulic pressure generator 122, wheel brake devices FR, FL, RR, and RL, a hydraulic circuit unit 123, a reservoir 124, and a sensor unit 125. The master cylinder 121 is connected to a brake pedal 20 and is configured to generate a hydraulic pressure when a driver presses the brake pedal 20. The hydraulic pressure generator 122 is configured to generate a hydraulic pressure using rotational power of a motor 150. For example, the hydraulic pressure generator 122 may be a type of piston pump configured to perform a linear piston motion in association with rotation of a shaft 153 of the motor 150. However, the hydraulic pressure generator 122 is not limited to this embodiment. The hydraulic pressure generator 122 may be, for example, a pump using an eccentric gear when it is included in a technical idea of generating hydraulic pressure using the rotational power of the motor 150.

The motor 150 includes a first coil 151, a second coil 152, a shaft 153, a first rotation angle sensor 155, and a second rotation angle sensor 156. At least a portion of the shaft 153 may be formed of a magnet. The first coil 151 and the second coil 152 may be disposed to surround at least a portion of an outer periphery of the shaft 153. When a current is applied to the first coil 151 or the second coil 152, the shaft 153 may rotate. Each of the first rotation angle sensor 155 and the second rotation angle sensor 156 may include a sensor for detecting magnetism of a magnetic material coupled to the shaft 153. The first control unit 130 may receive information on a rotation amount of the shaft 153 from the first rotation angle sensor 155. The second control unit 140 may receive information on the rotation amount of the shaft 153 from the second rotation angle sensor 156.

The wheel brake devices FR, FL, RR, and RL are configured to apply a braking force to the at least one wheels using the hydraulic pressure generated by the master cylinder 121 and/or the hydraulic pressure generator 122. The plurality of wheel brake devices FR, FL, RR, and RL may be mounted on different wheels. The wheel brake devices FR, FL, RR, and RL may be, for example, caliper brakes or drum brakes. The hydraulic circuit unit 123 is configured to selectively transmit the hydraulic pressure generated by the master cylinder 121 and/or the hydraulic pressure generator 122 to a plurality of wheel brake devices FR, FL, RR, and RL. The hydraulic circuit unit 123 may include a flow path unit and a valve unit. The flow path is arranged to interconnect the hydraulic pressure generator 122 and at least one of the wheel brake devices FR, FL, RR, and RL. The valve unit may include a plurality of valves configured to control a flow path of the fluid. The reservoir 124 is configured to supply a fluid for transmitting the hydraulic pressure to the wheel brake devices FR, FL, RR, and RL to at least one of the master cylinder 121, the hydraulic pressure generator 122, and the hydraulic circuit unit 123. The sensor unit 125 may include a first pressure sensor 127 configured to obtain information on the pressure on the side of the wheel brake devices FR, FL, RR, and RL, and a second pressure sensor 128.

The first control unit 130 may receive information on the hydraulic pressure from the first pressure sensor 127. The second control unit 140 may receive information on the hydraulic pressure from the second pressure sensor 128. Such information of the present disclosure may be transmitted/received using an in-vehicle network (Controller Area Network). FIG. 2 illustrates that the first pressure sensor 127 and the second pressure sensor 128 are separately provided. However, the cooperative brake apparatus 100 of the present disclosure includes an embodiment in which the first control unit 130 and the second control unit 140 receive information on the hydraulic pressure from one pressure sensor. A first motor controller 135 and a second motor controller 145 may perform feedback control using a current applied to the coil as an input value and the hydraulic pressure of a fluid as an output value.

According to an exemplary embodiment of the present disclosure, the first motor controller 135 and the second motor controller 145 may include a processor (e.g., computer, microprocessor, CPU, ASIC, circuitry, logic circuits, etc.) and an associated non-transitory memory storing software instructions which, when executed by the processor, performs various functions described hereinafter, respectively. Herein, the memory and the processor may be implemented as separate semiconductor circuits. Alternatively, the memory and the processor may be implemented as a single integrated semiconductor circuit. The processor may embody one or more processor(s).

The control units 130 and 140 may include the first control unit 130 connected to the first coil 151 and the second control unit 140 connected to the second coil 152. The first control unit 130 is configured to control the current applied to the first coil 151 to control the braking force generated by the hydraulic brake device 120 by the current applied to the first coil 151. The first control unit 130 may include all or some of a first driving circuit 131, a first current sensor 132, a first power source 133, and a first motor controller 135. The second control unit 140 is configured to control the current applied to the second coil 152 to control the braking force generated by the hydraulic brake device 120 by the current applied to the second coil 152. The second control unit 140 may include all or some of a second driving circuit 141, a second current sensor 142, a second power source 143, and a second motor controller 145. The second control unit 140 may be configured to have a lower specification than the first control unit 130. That is, the first control unit 130 may be configured to have better performance than the second control unit 140. For example, the second current sensor 142 included in the second control unit 140 may have lower measurement accuracy than the first current sensor 132. In the present disclosure, the first power source 133 and the second power source 143 are referred to as "power supply devices 133 and 143". The first power source 133 and the second power source 143 may be physically integrally formed or may be configured separately from each other. The first power source 133 and the second power source 143 are configured to store electrical energy. The first power source 133 may be a chemical cell or a capacitor. The second power source 143 may be a chemical cell or a capacitor. The first driving circuit 131 is configured to transmit electrical energy of the power supply devices 133 and 143 to the first coil 151. The second driving circuit 141 is configured to transmit the electrical energy of the power supply devices 133 and 143 to the second coil 152. Specifically, the first driving circuit 131 may transmit the electrical energy of the first power source 133 to the first coil 151, and the second driving circuit 141 may transmit the electrical energy of the second power source 143 to the second coil 152.

Figure 3:
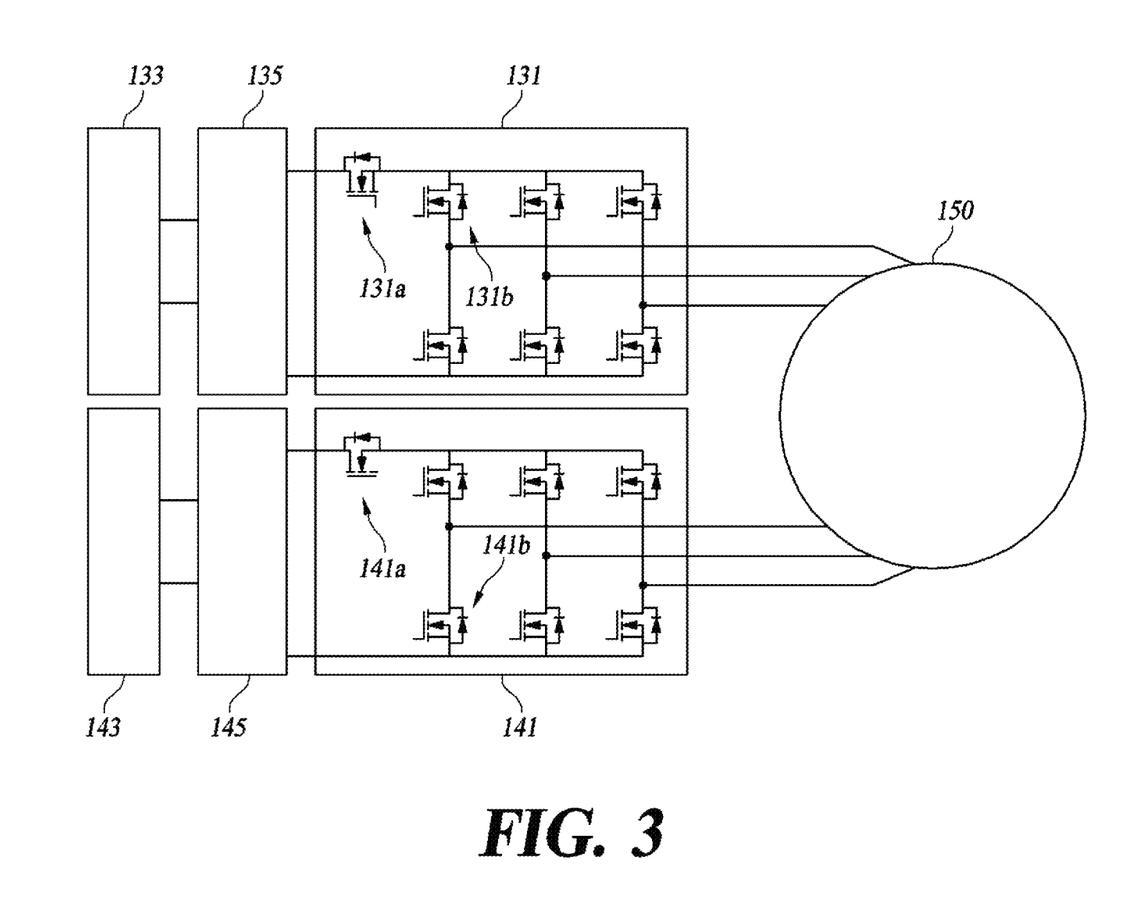
FIG. 3 illustrates configurations of a first driving circuit and a second driving circuit of the present disclosure.

FIG. 3 illustrates configurations of the first driving circuit and the second driving circuit of the present disclosure.

Referring to FIG. 3, the first driving circuit 131 may be an inverter configured to convert the power of the power supply devices 133 and 143 into three-phase and supply the converted power to the first coil 151. The first driving circuit 131 according to one embodiment of the present disclosure may include a first relay 131*a* and a plurality of first switches 131*b*. The first relay 131*a* is configured to cut off or allow the power supply of the power supply devices 133 and 143. The plurality of first switches 131*b* are configured to convert the power of the power supply devices 133 and 143 into three phases. The first switches may be configured to convert the power of the power supply devices 133 and 143 into three phases and supply the converted power to the second coil 152. The second driving circuit 141 may be an inverter configured to convert the power of the power supply devices 133 and 143 into three phases and supply the converted power to the second coil 152. The second driving circuit 141 according to one embodiment of the present disclosure may include a second relay 141a and a plurality of second switches 141b. The second relay 141a is configured to cut off or allow the power supply of the power supply devices 133 and 143. The plurality of second switches 141b are configured to convert the power of the power supply devices 133 and 143 into three phases.

Figure 4A:
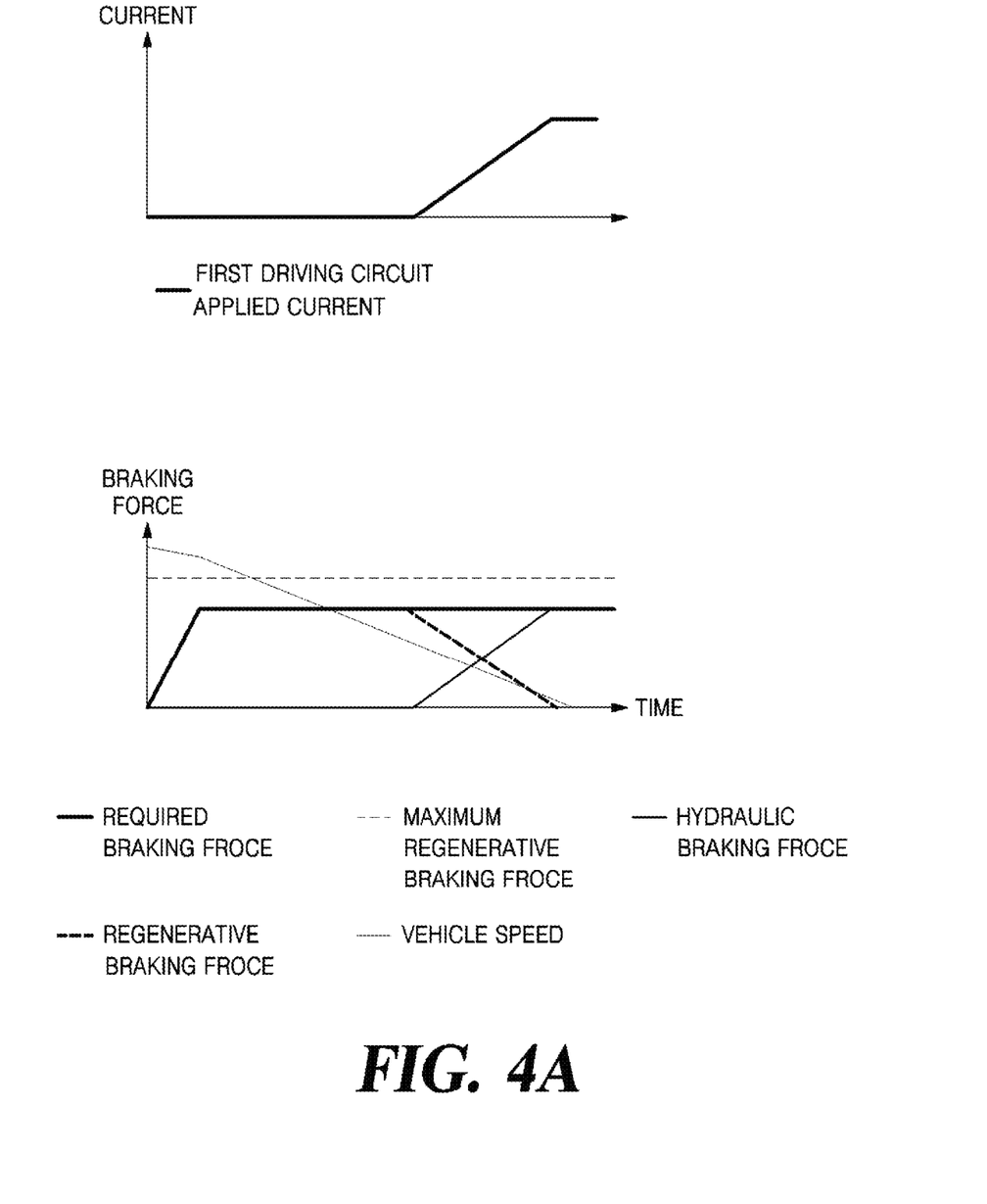
FIGS. 4A and 4B are graphs illustrating a braking force of the cooperative brake apparatus over time according to one embodiment of the present disclosure.
Figure 4B:
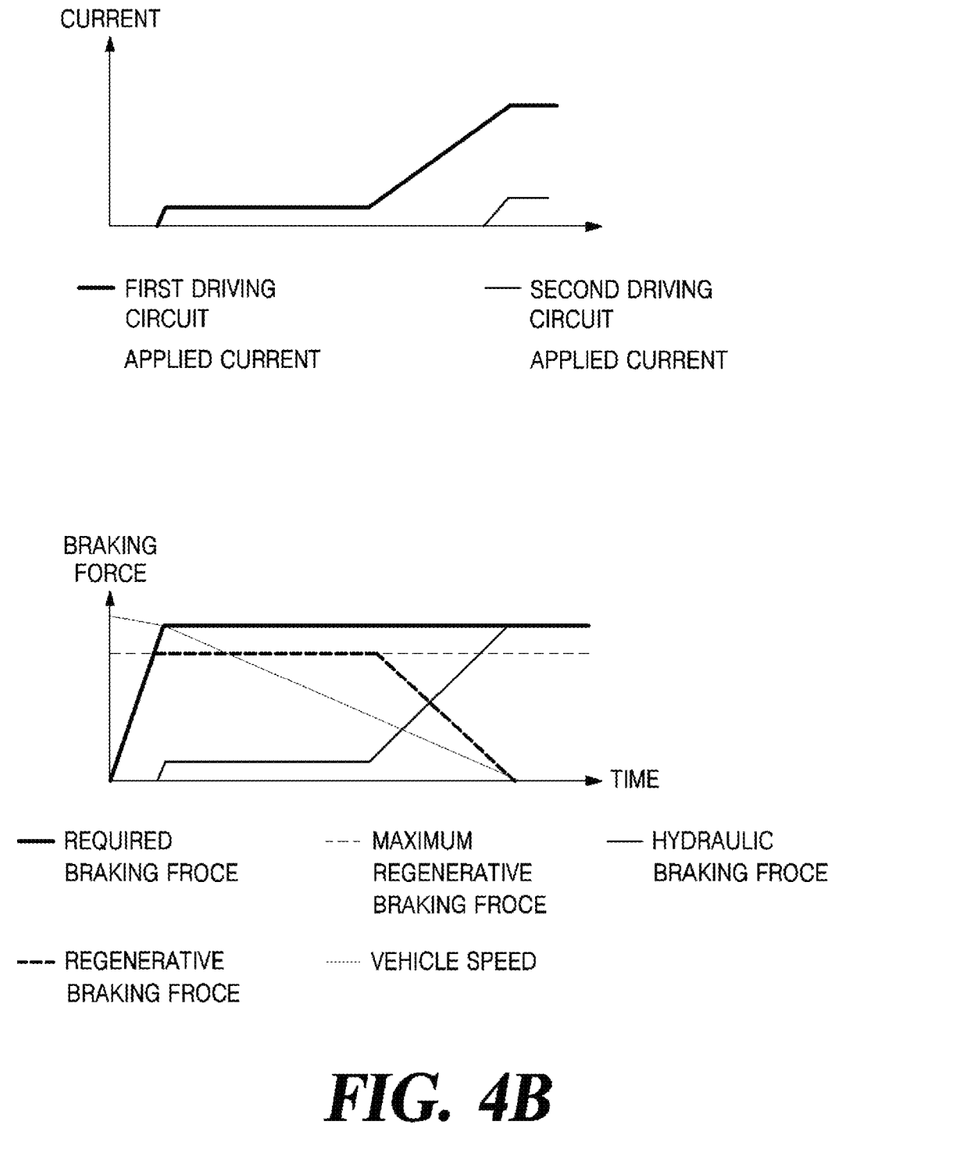

The first motor controller 135 controls the current applied to the first driving circuit 131. The second motor controller 145 controls the current applied to the second driving circuit 141. The first motor controller 135 and the second motor controller 145 control the currents applied to the first driving circuit 131 and the second driving circuit 141 based on the braking force applied to the at least one wheels by the regenerative brake device 110. Hereinafter, the braking force generated by the hydraulic braking device by the current applied to the first coil 151 is referred to as a "first braking force", and the braking force generated by the hydraulic braking device by the current applied to the second coil 152 is referred to as a "second braking force". The hydraulic pressure generated by the hydraulic braking device by the current applied to the first coil 151 may be proportional to the value of the current applied to the first coil 151. A current value applied to the first coil 151 may correspond to a current value applied to the first driving circuit 131. For example, the current value applied to the first coil 151 may be the same as the current value applied to the first driving circuit 131. The hydraulic pressure generated by the hydraulic brake by the current applied to the second coil 152 may be proportional to the value of the current applied to the second coil 152. The current value applied to the second coil 152 may correspond to the current value applied to the second driving circuit 141. For example, the current value applied to the second coil 152 may be the same as the current value applied to the second driving circuit 141. FIGS. 4A and 4B are graphs illustrating the braking force of the cooperative brake apparatus over time according to one embodiment of the present disclosure.

FIG. 4A is a graph illustrating the braking force of the cooperative brake apparatus over time when a sum of a first maximum braking force and a regenerative braking force is greater than a required braking force.

FIG. 4B is a graph illustrating the braking force of the cooperative brake apparatus over time when the sum of the first maximum braking force and the regenerative braking force is smaller than the required braking force.

Referring to FIG. 4A, in one embodiment of the present disclosure, the second motor controller 145 does not apply current to the second driving circuit 141 when the sum of the first maximum braking force and the regenerative braking force is greater than the required braking force. Here, the "first maximum braking force" refers to a hydraulic braking force generated by the hydraulic brake device 120 by the maximum allowable current applied to the first coil 151 when the maximum allowable current is applied to the first coil 151. The first maximum braking force may have a preset value according to the design specification of the motor 150.

The required braking force may be a braking force required to brake the vehicle as intended by the driver. In this case, the required braking force may be calculated by the control units 130 and 140 using information on a pedal stroke obtained by a pedal stroke sensor mounted on the brake pedal 20. The required braking force may be a braking force calculated by a vehicle autonomous traveling system to allow the vehicle to operate safely. When the sum of the first maximum braking force and the regenerative braking force is greater than the required braking force, the first motor controller 135 may control the current applied to the first coil 151 so that the sum of the first braking force and regenerative braking force is equal to the required braking force. Here, the "first braking force" refers to a braking force generated by the hydraulic brake device 120 by the current applied to the first coil 151. Here, the first motor controller 135 may receive information on the hydraulic pressure on the side of the wheel brake devices FR, FL, RR, and RL or the hydraulic pressure on the outlet side of the motor 150 from the pressure sensor. The first motor controller 135 may feedback-control the first current based on the pressure information received from the first pressure sensor 127. The braking force is precisely controlled by this feedback control.

In the conventional cooperative brake apparatus, when the main motor controller increases (or decreases) the output current value and the auxiliary motor controller decreases (or increases) the output current value, there is a problem that the main motor controller and the auxiliary motor controller determines mutual outputs as disturbance and the output of each controller may diverge. In the cooperative control apparatus according to one embodiment of the present disclosure, when the sum of the first maximum braking force and the regenerative braking force is greater than the required braking force, the second motor controller 145 does not apply a current to the second coil 152. In this way, it is possible to prevent the problem that the output of the second motor controller 145 is determined to be a disturbance by the first motor controller 135 and the output of each controller is not precisely controlled or diverged.

Referring to FIG. 4B, when the sum of the first maximum braking force and the regenerative braking force is smaller than the required braking force, the second motor controller 145 applies a current to the second driving circuit 141 so that the sum of the hydraulic braking force and the regenerative braking force is equal to the required braking force. That is, when the required braking force cannot be satisfied only with the current applied to the regenerative brake device 110 and the first coil 151, the first motor controller 135 as well as the second motor controller 145 can apply a current to the coil. A rotational force of a shaft 153 of the motor 150 is added by the current applied to the second coil 152, and the required braking force may be satisfied.

Specifically, when the sum of the first maximum braking force and the regenerative braking force is smaller than the required braking force, the first motor controller 135 control the current applied to the first coil 151 and the second motor controller 145 controls the current applied to the second coil 152 so that the sum of the hydraulic braking force and regenerative braking force is equal to the required braking force. Here, the second motor controller 145 may be configured to calculate the second current to be applied to the second driving circuit 141 based on the required braking force and the maximum braking force.

The second motor controller 145 may include all or some of a required current calculator, a first current calculator, a second current calculator, and a current applying device. The required current calculator calculates the required current corresponding to the required braking force. Here, the required current corresponding to the required braking force may be a current value when the magnitude of the braking force generated by the current applied to the second driving circuit 141 becomes the required braking force. The first current calculator calculates the first current corresponding to a braking force obtained by adding the regenerative braking force and the first maximum braking force. The second current calculator calculates the second current based on the required current and the first braking force. Here, the first current and the second current may be calculated based on the property that the hydraulic pressure generated by the hydraulic brake is proportional to the current value applied to the coil. When the specifications of the first coil 151 and the second coil 152 are the same, the second current calculator may calculate the second current by simply calculating a difference between the required current and the first current. When the sum of the first maximum braking force and the regenerative braking force is smaller than the required braking force, the second motor controller 145 may apply the calculated second current to the second coil 152. In the meantime, the first motor controller 135 may receive information on the hydraulic pressure from the first pressure sensor 127 and feedback-control the current applied to the first coil 151.

When a failure of the first driving circuit 131 is detected, the first motor controller 135 may control the first relay 131*a* so that the first relay 131*a* cuts off power supply to the first coil 151. In this way, the faulty first driving circuit 131 does not intervene in braking of the vehicle. The second motor controller 145 according to one embodiment of the present disclosure may be configured to assist the first motor controller 135 to generate the required braking force when the first motor controller 135 fails. The second motor controller 145 controls the current applied to the second driving circuit 141 such that the sum of the regenerative braking force and the hydraulic braking force is equal to the required braking force. That is, the second motor controller 145 may additionally generate a braking force equal to the hydraulic braking force lost due to the failure of the first driving circuit 131. Here, the second motor controller 145 may receive the hydraulic pressure information from the second pressure sensor 128 and feedback-control the current applied to the first coil 151.

A failure may occur in the first relay 131*a* instead of the first driving circuit 131. When a failure of the first relay 131*a* is detected, the first motor controller 135 may transmit a switching open control signal to the first switch 131*b* to prevent the failed first driving circuit 131 from intervening in braking of the vehicle. The second motor controller 145 controls the current applied to the second driving circuit 141 such that the sum of the regenerative braking force and the hydraulic braking force is equal to the required braking force. In order to prevent overheating of the second driving circuit 141, the second motor controller 145 may control the first switch 131*b* to reduce an operation time of each second switch 141*b* by ¼ compared to the normal operation of the first control unit 130.

When a failure of the second driving circuit 141 is detected, the second motor controller 145 may control the second relay 141*a* so that the second relay 141*a* cuts off the power supply to the second coil 152. In this way, the faulty second driving circuit 141 does not intervene in braking of the vehicle. The first motor controller 135 according to one embodiment of the present disclosure may be configured to assist the second motor controller 145 when the second motor controller 145 fails. Here, the first motor controller 135 controls the current applied to the first driving circuit 131 so that the sum of the regenerative braking force and the hydraulic braking force is equal to the required braking force. That is, the first motor controller 135 may additionally generate a braking force equal to the hydraulic braking force lost due to the failure of the first driving circuit 131. Here, the first motor controller 135 may receive hydraulic pressure information from the first pressure sensor 127 and feedback-control the current applied to the first coil 151.

A failure may occur in the second relay 141*a* instead of the second driving circuit 141. When the failure of the second relay 141*a* is detected, the second motor controller 145 may transmit a switching open control signal to the second switch 141*b* to prevent the failed second driving circuit 141 from intervening in braking of the vehicle. The first motor controller 135 controls the current applied to the first driving circuit 131 such that the sum of the regenerative braking force and the hydraulic braking force is equal to the required braking force. In order to prevent overheating of the first driving circuit 131, the first motor controller 135 may control the first switch 131*b* so that the operating time of each first switch 131*b* is reduced to ¼ of that of the normal operation of the second control unit 140.

Referring to FIG. 4, a flow path unit according to one embodiment of the present disclosure may include all or some of a first connection flow path 123*a*, a second connection flow path 123*b*, a front flow path, 123*e*, a rear flow path 123*f*, and a return flow path 123*g*. When the shaft 153 of the motor 150 rotates clockwise, the fluid may be discharged to the first connection flow path 123*a*. When the shaft 153 of the motor 150 rotates counterclockwise, hydraulic pressure may be discharged through the second connection flow path 123*b*. The front flow path 123*e* connects the wheel brake devices FR and FL installed on the front wheels to the first connection flow path 123*a*. The rear flow path 123*f* connects the wheel brake devices RR and RL installed on the rear wheels to the second connection flow path 123*b*. The connection flow path connects the rear flow path 123*f* to the front flow path 123*e*. The return flow path 123*g* connects the reservoir 124 and the wheel brake devices FR, FL, RR, and RL, and guides the fluid so that the fluid moves to the reservoir 124 when the wheel brake devices FR, FL, RR, and RL are depressurized.

Referring to FIG. 2, the valve unit includes at least one valve installed in the flow path unit to control the flow path of the fluid. The valve unit may include at least one solenoid valve. The valve unit according to one embodiment includes all or some of a first valve MCV1, a second valve MCV2, a connection control valve LSV, a first inlet valve IVFR, a second inlet valve IVFL, a third inlet valve IVRR, a fourth inlet valve IVRL, a first outlet valve OVFR, a second outlet valve OVFL, a third outlet valve OVRR, and a fourth outlet valve OVRL. The connection control valve LSV is installed on the connection flow path to fluidly communicate or block the front flow path 123*e* and the rear flow path 123*f* The connection control valve LSV may be a normal-close valve.

The first valve WSV may be disposed on the first connection flow path 123*a* and the second valve RCV may be disposed on the second connection flow path 123*b*. The first inlet valve IVFR and the second inlet valve IVFL are disposed on the front flow path 123*e*. The first inlet valve IVFR is disposed on the side of the wheel brake device FR mounted on the front right wheel. The first inlet valve IVFR is configured to open when the hydraulic pressure of the wheel brake device FR mounted on the front right wheel is applied. The first inlet valve IVFR may be a normal-open valve. The second inlet valve IVFL is disposed on the side of the wheel brake device FL mounted on the front left wheel. The second inlet valve IVFL is configured to open when the hydraulic pressure of the wheel brake device FL mounted on the front left wheel is applied. The second inlet valve IVFL may be a normal-open valve.

The third inlet valve IVRR and the fourth inlet valve IVRL are disposed on the rear flow path 123*f* The third inlet valve IVRR is disposed on the side of the wheel brake device RR mounted on the rear right wheel. The third inlet valve IVRR is configured to open when the hydraulic pressure of the wheel brake device RR mounted on the rear right wheel is applied. The third inlet valve IVRR may be a normal-open valve. The fourth inlet valve IVRL is disposed on the side of the wheel brake device RL mounted on the left rear wheel. The fourth inlet valve IVRL is configured to open when the hydraulic pressure of the wheel brake device L mounted on the left rear wheel is applied. The fourth inlet valve IVRL may be a normal-open valve.

The first discharge valve OVFR, the second discharge valve OVFL, the third discharge valve OVRR, and the fourth discharge valve OVRL are disposed on the return flow path 123g and may be a normal-closed valve. The first discharge valve OVFR is disposed on the side of the wheel brake device FR mounted on the front and right wheel. The first discharge valve OVFR may be opened when the hydraulic pressure of the wheel brake device FR mounted on the front right wheels is reduced. The second discharge valve OVFL is disposed on the side of the wheel brake device FL mounted on the front left wheel. The second discharge valve OVFL may be opened when the hydraulic pressure of the wheel brake device FL mounted on the front wheel is reduced. The third discharge valve OVRR is disposed on the side of the wheel brake device RR mounted on the rear right wheel. The third discharge valve OVRR may be opened when the hydraulic pressure of the wheel brake device RR mounted on the rear right wheel is reduced. The fourth discharge valve OVRL is disposed on the side of the wheel brake device RL mounted on the rear left wheel. The fourth discharge valve OVRL may be opened when the hydraulic pressure of the wheel brake device RL mounted on the rear left wheel is reduced.

Figure 5:
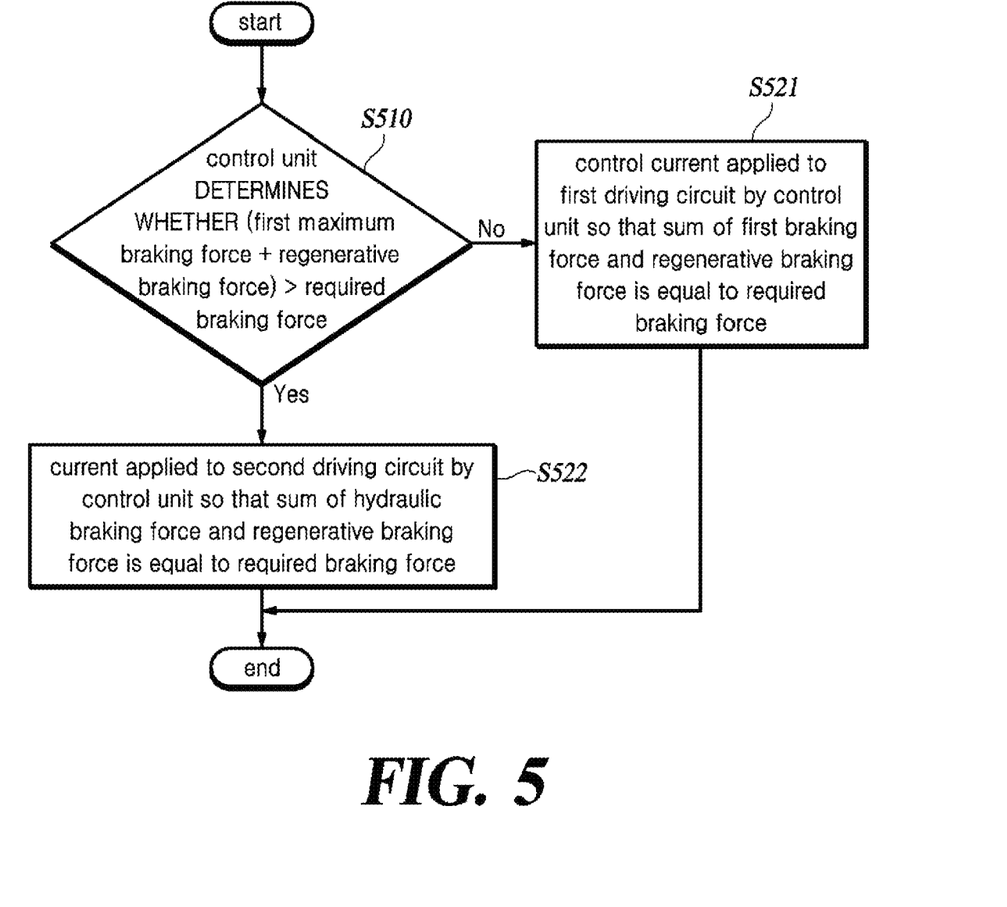
FIG. 5 is a flowchart illustrating a control method of the cooperative brake apparatus according to one embodiment of the present disclosure.

FIG. 5 is a flowchart illustrating a control method of the cooperative brake apparatus according to one embodiment of the present disclosure.

By the control method of a cooperative brake apparatus according to one embodiment of the present disclosure, the cooperative brake apparatus 100 including the hydraulic brake device 120 configured to apply the braking force to the at least one wheels using hydraulic pressure formed by the motor 150 including the first coil 151 and the second coil 152 and the regenerative brake device 110 is controlled. The control method of the cooperative brake apparatus 100 may be performed by the cooperative brake apparatus 100 described above. Therefore, the overlapping description will be omitted. In the control method of the cooperative brake apparatus 100, the control units 130 and 140 may be understood as devices including the first control unit 130 and the second control unit 140 described above.

Referring to FIG. 5, in Steps S510, S521, and S522, the control units 130 and 140 control the current applied to the first driving circuit 131 and the current applied to the second driving circuit 141 based on the braking force applied to the at least one wheels by the regenerative brake device 110. Specifically, in Step S510, the control units 130 and 140 determine a magnitude relationship between the sum of the first maximum braking force and the regenerative braking force and the required braking force. When the sum of the first maximum braking force and the regenerative braking force is greater than the required braking force, the control units 130 and 140 control the current applied to the first driving circuit 131 so that the sum of the first braking force and the regenerative braking force is equal to the required braking force (S521). When the sum of the first maximum braking force and the regenerative braking force is smaller than the required braking force, the control units 130 and 140 control the current applied to the second driving circuit 141 so that the sum of the hydraulic braking force and the regenerative braking force is equal to the required braking force (S522). According to the control method according to one embodiment of the present disclosure, when the regenerative brake device and the hydraulic brake device are simultaneously operated, the hydraulic brake device may be precisely controlled.

What is claimed is:

1. A cooperative brake apparatus comprising:
a regenerative brake device configured to apply a regenerative braking force to a vehicle;
a hydraulic brake device configured to apply a hydraulic braking force to at least one wheels using a hydraulic pressure formed by a motor including a first coil and a second coil; and
controller including a power source, a first driving circuit configured to transmit electrical energy of the power source to the first coil, a second driving circuit configured to transmit the electrical energy of the power source to the second coil, a first motor controller configured to control a current applied to the first driving circuit, and a second motor controller configured to adjust a current applied to the second driving circuit,
wherein each of the first motor controller and the second motor controller controls the current applied to the first driving circuit and the second driving circuit, respectively, based on the regenerative braking force,
the second motor controller determines whether to apply a current to the second driving circuit based on a sum of the regenerative braking force and a first maximum braking force, a required braking force and a rotational force of a shaft associated with the at least one wheels received from a rotation sensor connected to the second motor controller,
the first maximum braking force is a hydraulic braking force generated by the hydraulic brake by a maximum allowable current applied to the first coil.

2. The cooperative brake apparatus of claim 1, wherein the second motor controller does not apply the current to the second driving circuit when the sum of the regenerative braking force and the first maximum braking force is greater than the required braking force, and
when a maximum allowable current is applied to the first coil, the first maximum braking force is a hydraulic braking force generated by the hydraulic brake device by the maximum allowable current applied to the first coil.

3. The cooperative brake apparatus of claim 2, wherein when the sum of the first maximum braking force and the regenerative braking force is greater than the required braking force, the first motor controller applies a current to the first driving circuit so that a sum of a first braking force, which is a braking force generated by the hydraulic brake by the current applied to the first coil, and the regenerative braking force is equal to the required braking force.

4. The cooperative brake apparatus of claim 1, wherein the second motor controller applies the current to the second driving circuit when the sum of the regenerative braking force and a first maximum braking force is smaller than the required braking force, and
when a maximum allowable current is applied to the first coil, the first maximum braking force is a hydraulic braking force generated by the hydraulic brake device by the maximum allowable current applied to the first coil.

5. The cooperative brake apparatus of claim 4, wherein when the sum of the first maximum braking force and the regenerative braking force is smaller than the required braking force, the second motor controller applies a current to the second driving circuit so that the sum of the hydraulic braking force and the regenerative braking force is equal to the required braking force.

6. The cooperative brake apparatus of claim 5, wherein the second motor controller includes,
a required current calculator configured to calculate a required current corresponding to the required braking force,
a first current calculator configured to calculate a first current corresponding to a braking force obtained by adding a regenerative braking force and the first maximum braking force, and
a second current calculator configured to calculate a second current using the required current and the first current,
wherein the second motor controller is further configured to determine application of the second current to the second driving circuit.

7. The cooperative brake apparatus of claim 6, further comprising a first pressure sensor configured to obtain information on a pressure of a fluid pressurized by the motor,
wherein when the sum of the first maximum braking force and the regenerative braking force is smaller than the required braking force, the first motor controller is configured to feedback-control a current applied to the first driving circuit by using fluid pressure information received from the first pressure sensor.

8. The cooperative brake apparatus of claim 1, wherein the first driving circuit includes,
a first relay configured to cut off or allow power supply of the power source, and
a plurality of first switches configured to convert the power supply to three phases.

9. The cooperative brake apparatus of claim 8, wherein the second driving circuit includes
a second relay configured to cut off or allow power supply of the power source, and
a plurality of second switches configured to convert the power supply to three phases.

10. The cooperative brake apparatus of claim 9, wherein in response to detection of a failure of the second driving circuit, the second motor controller controls the second relay so that the second relay cuts off the power supply to the second coil, and the first motor controller controls the current applied to the first driving circuit so that the sum of the regenerative braking force and the hydraulic braking force is equal to the required braking force.

11. The cooperative brake apparatus of claim 9, wherein in response to detection of a failure of the second relay, the second motor controller transmits a switching open control signal to the second switch, and the first motor controller controls the current applied to the first driving circuit so that the sum of the regenerative braking force and the hydraulic braking force is equal to the required braking force.

12. The cooperative brake apparatus of claim 9, wherein in response to detection of a failure of the first driving circuit,
the first motor controller controls the first relay so that first relay cuts off the power supply to the first coil, and the second motor controller controls the current applied to the second driving circuit so that the sum of the regenerative braking force and the hydraulic braking force is equal to the required braking force.

13. The cooperative brake apparatus of claim 12, further comprising: a second sensor configured to obtain information on a pressure of a fluid pressurized by the motor,
wherein in response to the detection of the failure of the first driving circuit, the second motor controller is configured to feedback-control a current applied to the second driving circuit by using fluid pressure information received from the second pressure sensor.

14. The cooperative brake apparatus of claim 9, wherein in response to detection of a failure of the first relay, the first motor controller transmits a switching open control signal to the first switch, and the second motor controller controls the current applied to the first driving circuit so that the sum of the regenerative braking force and the hydraulic braking force is equal to the required braking force.

15. The cooperative brake apparatus of claim 14, further comprising: a second sensor configured to obtain information on a pressure of a fluid pressurized by the motor,
wherein in response to the detection of the failure of the first driving circuit, the second motor controller is configured to feedback-control a current applied to the second driving circuit by using fluid pressure information received from the second pressure sensor.

16. A control method of a cooperative brake apparatus including a hydraulic brake configured to apply a braking force to at least one wheels using a hydraulic pressure formed by a motor including a first coil and a second coil, and a regenerative brake, the control method comprising:
a hydraulic brake control process in which a controller controls a current applied to a first driving circuit corresponding to the first coil and a current applied to a second driving circuit corresponding to the second coil based on a braking force applied to at least one wheels by the regenerative brake,
the hydraulic brake control process including:
determining whether to apply a current to the second driving circuit based on a sum of the regenerative braking force and a first maximum braking force, a required braking force and a rotational force of a shaft associated with the at least one wheels received from a rotation sensor connected to the controller,
wherein the first maximum braking force is a hydraulic braking force generated by the hydraulic brake by a maximum allowable current applied to the first coil.

17. The control method of claim 16, wherein in response to determination that the sum of the first maximum braking force and the regenerative braking force is smaller than the required braking force, the hydraulic brake control process includes a process in which the controller controls the current applied to a first driving circuit configured to transmit electrical energy of a power source to the first coil so that a sum of a first braking force, which is a braking force generated by the hydraulic brake by the current applied to the first coil, and the regenerative braking force is equal to the required braking force, and
when a maximum allowable current is applied to the first coil, the first maximum braking force is a hydraulic braking force generated by the hydraulic brake device by the maximum allowable current applied to the first coil.

18. The control method of claim 17, wherein in response to determination that the sum of the first maximum braking force and the regenerative braking force is smaller than the required braking force, the hydraulic brake control process includes a process in which the control unit controls the current applied to a second driving circuit configured to transmit the electrical energy of the power source to the second coil so that a sum of the hydraulic braking force generated by the current applied to the second coil and the regenerative braking force is equal to the required braking force.

\* \* \* \* \*